United States Patent [19]

Gladstone et al.

[11] Patent Number: 4,843,946
[45] Date of Patent: Jul. 4, 1989

[54] FILAMENT-WOUND VENTURI

[75] Inventors: David H. Gladstone, Quebec; Raymond Langlois, Loretteville; William J. Robertson, Sillery, all of Canada

[73] Assignee: Her Majesty the Queen in right of Canada, as represented by the Minister of National Defense of Her Majesty's Canadian Government, Canada

[21] Appl. No.: 117,927

[22] Filed: Nov. 4, 1987

Related U.S. Application Data

[63] Continuation of Ser. No. 738,179, May 28, 1985, abandoned.

[30] Foreign Application Priority Data

Nov. 27, 1984 [CA] Canada .................................. 468797

[51] Int. Cl.⁴ ........................ F41F 17/06; F41F 17/08
[52] U.S. Cl. ......................................... 89/15; 89/1.7
[58] Field of Search .................. 89/15, 16, 1.7, 14.05; 42/75.01

[56] References Cited

U.S. PATENT DOCUMENTS

| | | | |
|---|---|---|---|
| 2,847,786 | 8/1958 | Hartley et al. | 89/16 |
| 3,144,808 | 8/1964 | Stapp et al. | 89/1.705 |
| 3,298,279 | 1/1967 | Barnet et al. | 42/76.02 |
| 3,517,585 | 6/1970 | Slade | 89/16 |
| 3,641,870 | 2/1972 | Eig | 89/15 |
| 4,137,351 | 1/1979 | Clodfelter et al. | 89/16 |
| 4,401,729 | 8/1983 | Claussen et al. | 89/16 |
| 4,424,734 | 1/1984 | Janssen et al. | 89/16 |
| 4,435,455 | 3/1984 | Prewo et al. | 42/76 A |
| 4,485,721 | 12/1984 | Shankhla et al. | 89/16 |
| 4,556,438 | 12/1985 | Hoffmeister et al. | 156/79 |
| 4,669,212 | 6/1987 | Jackson et al. | 89/16 |
| 4,685,236 | 8/1987 | May | 89/14.05 |

FOREIGN PATENT DOCUMENTS

| | | | |
|---|---|---|---|
| 578034 | 6/1959 | Canada | 89/15 |
| 3212721 | 10/1983 | Fed. Rep. of Germany . | |
| 1597423 | 8/1970 | France . | |
| 865884 | 4/1961 | United Kingdom | 89/1.704 |
| 1593485 | 7/1981 | United Kingdom | 102/211 |

Primary Examiner—Deborah L. Kyle
Assistant Examiner—Stephen Johnson
Attorney, Agent, or Firm—Stevens, Davis, Miller & Mosher

[57] ABSTRACT

A venturi section or cone for a lightweight firearm such as a recoilless gun which is subjected to high transient pressures and temperatures on firing is formed from a resin impregnated multi-filament fiber material. The material in the form of an elongated tow is wound on a mandrel, cured, and then removed from the mandrel for subsequent operations such as machining or assembly. During manufacture, a hot gas erosion preventing layer is first formed on the mandrel and a plurality of layers of two are helically wound thereon at a helix angle selected to provide adequate axial and hoop strengths for resisting axial thrust and hoop loads produced on firing. Lightweight recoilless guns using such venturi cones are lighter and cheaper to fabricate than conventional guns and will fire more rounds before excessive erosion causes them to be unusable.

8 Claims, 4 Drawing Sheets

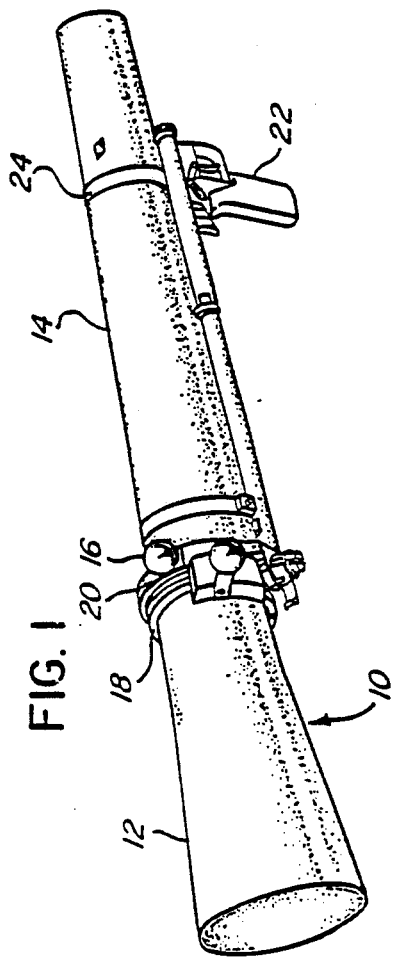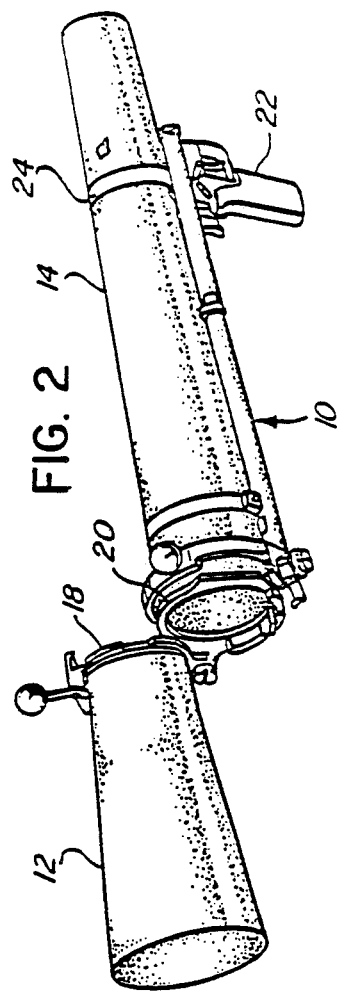

FILAMENT-WOUND VENTURI

This application is a continuation of application Ser. No. 738,179, filed May 28, 1985, now abandoned.

This invention relates to a structural element in the form of a tubular item made of a fibre reinforced composite material. More particularly, the invention relates to a venturi section or exit cone for a lightweight firearm and to the method of making the same from a resin-treated multi-filament fibre material. The invention defined herein is related to that disclosed and claimed in commonly assigned U.S. application Ser. No. 705,112 filed Feb. 25, 1985 for "Carbon-Fibre Gun Barrel".

BACKGROUND OF THE INVENTION

As described in the U.S. Army Engineering Design Handbook on Recoilless Rifle Weapon Systems (AMCP 706,238), all recoilless rifles use a venturi behind the breech section thereof to vent propellant gases. This venturi is generally cone-shaped and is designed so that the momentum of the escaping propellant gases will equal that imparted to the projectile, thus ensuring recoilless operation. The venturi must be designed to withstand hoop loads resulting from the static pressure of the gases, as well as an axial or thrust load which is a function of the cone divergence angle.

The major in-service recoilless rifles (the U.S. 90 mm and 106 mm Systems and the Swedish 84 mm Carl Gustaf) all use machined steel venturis which are relatively heavy and costly to fabricate given their small wall thickness and three-dimensional configurations. For example, the venturi section of a typical 84 mm in-service recoilless gun, including the venturi cone and the breech adapter portion therefor weighs about 2.0 kg. Any improvement in that figure is a bonus to the infantryman who has to carry his gun over long distances.

Until recently the venturi design has not received as much attention as the barrel portion of the firearm; see for example the copending application referred to above. The barrel section is more important to the proper functioning of the firearm and there has been an absence of major problems with the venturi. However, significant weight savings in the barrel section through the use of a carbon-fibre/epoxy resin composite material (from 8.5 kg to 2.8 kg) have resulted in the venturi portion assuming a larger percentage of the overall weight and it is therefore advantageous to endeavour to reduce the weight of the venturi portion.

A prime consideration in redesigning the venturi portion was to ensure that there is sufficient gas erosion resistance in the critical breech area. It was therefore decided to retain the throat ring/breech adapter of the existing firearm and to concentrate on the cone portion of the venturi for weight reduction. Furthermore, the throat ring adapter is subjected to complicated loadings on firing and it was deemed desirable to continue with an accepted, suitable design.

The decision to use the existing throat ring adapter complicates, however, the problem of reducing venturi weight since in the existing venturi the adapter constitutes 38.2% of the total weight. In a reduced-weight venturi it would represent a higher percentage of the total weight. In attempting to redesign the venturi cone the advantages achieved with filament wound barrels, as documented in the copending application referred to above, were deemed to be significant and consequently it was decided to apply the knowledge gained in the barrel development work to the venturi situation. It was not possible, however, to prepare a venturi cone in the same manner as a barrel section because they are subjected to different loadings and design requirements. For example, the transient thrust loads experienced by the venturi cone have a profound effect on the threaded connection between the cone and the throat ring/breech adapter. Also, the cone portion is more prone to impact than is the barrel section and that fact must also be taken into consideration when choosing materials and winding angles.

SUMMARY OF THE INVENTION

The invention described herein relates to the construction of the venturi cone of a recoilless weapon which is subjected to high transient internal pressures and temperatures on firing. A resin-treated multi-filament fibre material is wound on a suitably configured frustoconical mandrel as a tow in a plurality of superimposed layers. At least the innermost layer is formed of a material which is particularly suited to resisting hot gas erosion. The tow of material is wound on the mandrel at a helix angle which provides adequate axial and hoop strengths for resisting axial thrust and hoop loads produced on firing. The cone, after curing and removal from the mandrel is threaded onto the threaded portion of the throat ring/breech adapter to create a venturi section for use in a recoilless gun.

As indicated above the average helix angle $\theta$ should meet the requirements for an adequate ratio of axial to hoop strengths, as determined by the expression $$\theta = \tan^{-1}\left(\frac{\sigma_{axial}}{\sigma_{hoop}}\right)$$

where $\sigma_{axial}$ and $\sigma_{hoop}$ are the axial and hoop stresses produced in the venturi section by axial and hoop loads respectively. Calculations and tests have shown that a desirable average helix angle for the venturi cone is about 80° although the angle could vary from about 76.5° at the breech area to about 90° at the exit area. Furthermore, for the purposes of reducing gas erosion as much as possible it is desirable that the innermost layer of the cone be hoop wound or consist of a resin-impregnated fabric of refractory fibres. Carbon fibre and ceramic fibre fabrics have been found to be particularly effective.

Cones have been constructed using carbon-fibre/epoxy resin composite materials and the weight of the cone, when compared to existing systems has almost been halved. Further weight and/or cost savings might be gained through the use of other materials, such as aromatic polyamide fibers (e.g. Kevlar) (Trademark)/epoxy composites.

Other features and advantages will become apparent in the following description of the invention which is to be considered in conjunction with the drawings.

BRIEF DESCRIPTION OF THE DRAWINGS

FIG. 1 illustrates in perspective a light recoilless gun (LRG) to which the present invention is applicable.

FIG. 2 shows the LRG of FIG. 1 in a "breech open" condition, ready for loading or unloading.

DESCRIPTION OF THE PREFERRED EMBODIMENT

Figure 3:
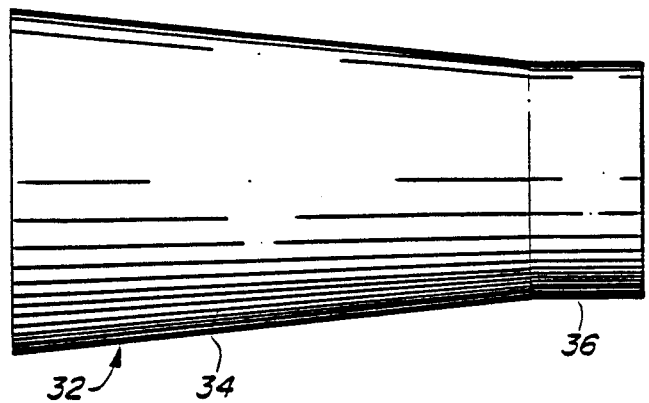
FIG. 3 shows a mandrel which could be used in producing the venturi section for the LRG of FIG. 1.

Turning to the drawings, FIG. 1 shows a structural element in the form of a recoilless weapon (LRG) 10. A venturi or diffuser section 12 and a barrel or pressure section 14 are coupled together by a breech assembly 16. The breech assembly 16 is totally conventional in form, and need not be further described here for an understanding of this invention. It is noted that the breech assembly 16 includes a two part base ring, whose parts 18 and 20 fixedly support the diffuser and pressure section 12 and 14. The parts 18 and 20 are pivotally interconnected so as to provide for relative movement and enable loading of the barrel section 14. This is clearly seen by comparing FIG. 1 in which the breech assembly 16 is closed, and FIG. 2 in which the breech assembly is open. The recoilless weapon 10 shown in FIGS. 1 and 2 includes a trigger and firing mechanism 22 supported from the pressure section 14 by a support strap or ring 24. These are also conventional in the recoilless weapons art and need not be further described here.

It has been found, as indicated in commonly assigned Canadian Pat. No. 1,167,676 issued May 22, 1984 that contrary to teachings of the prior art such as Canadian Pat. No. 582,160, a unitary barrel construction can be made from non-metallic fibre reinforced composite materials. Moreover, such a barrel need not use metal liners. Reinforcing fibres such as graphite (carbon), boron, and beryllium, as well as glass have, in certain forms, greatly superior strength and stiffness properties as compared to bulk metals such as steel, titanium or aluminum. It is known, of course, that alloys of those metals are commonly used in making gun barrels. As mentioned earlier, conventional wisdom previously required that barrels and venturi cones be made entirely of metal, or at least use a metal liner, overwrapped perhaps with reinforcing glass fibre.

As pointed out in Canadian Pat. No. 1,167,676 barrels acceptable for use in recoilless weapons can be made and used without the need for a liner, metallic or otherwise. Such a barrel is made in the form of a tubular structural element of a non-metallic fibre reinforced composite material and, depending on the requirement of the element, it may have interior projections (rifling or the like) integrally formed therewith.

Furthermore, as pointed out in the copending application No. 705,112 referred to above, improvements in the construction of the barrel section as described in Canadian Pat. No. 1,167,676 can be achieved, which improvements are also beneficial to the construction of the venturi or diffuser cone 12.

In order to produce the desired venturi section it is necessary to first of all produce a mandrel on which the fibre-reinforced composite material will be wound and, after winding, cured to produce the desired element. Thus, in producing the mandrel, the volume and thermal expansibility of the mandrel material must be taken into account since the final dimensions of the mandrel are derived when both the mandrel and the composite material wound thereon are at curing temperatures. At room temperatures the dimensions of the mandrel will normally be somewhat less than those at curing temperatures.

FIG. 3 illustrates a typical mandrel which might be used to produce the venturi section or cone 12 shown in FIGS. 1 and 2. The mandrel 32 is provided with a generally frustoconical surface portion 34 which corresponds to the diffuser portion of the venturi. At the smaller diameter end there is a generally cylindrical portion 36 which will form the forward portion which is to be threaded to the throat ring/breech adapter. The threads on the cone may be formed in two ways: (a) they can be machined in the cone after curing and removal from the mandrel, in which case the surface of the portion 36 will be smooth; or (b) they can be formed directly during formation of the cone, in which case the surface of the portion 36 will be created with helical grooves therein corresponding to the desired thread form. To remove the final cured cone from the mandrel under (a) it need only be slid therealong and removed from the small diameter end. Thereafter the threads would be machined into the small cylindrical portion of the cone. To remove the final cured cone from the mandrel under (b) it need only be rotated so that it can be screwed off the groove portion 36 of the mandrel. If the threads formed in the cone are rough or unfinished it may be necessary to slightly touch them up with a suitable machining operation. In either of the situations mentioned above, it may be necessary to coat the mandrel, or at least portions thereof with a suitable release agent to ensure easy removal of the cone from the mandrel.

The wall thickness of the venturi cone must be sufficiently great to withstand the static and dynamic forces placed thereon by the exhausting gases during firing. Furthermore the venturi cone must be sufficiently rugged to avoid damage during handling and for this reason the analysis which determined the optimum winding angle for the barrel section is not application to the venturi cone.

Figure 5:
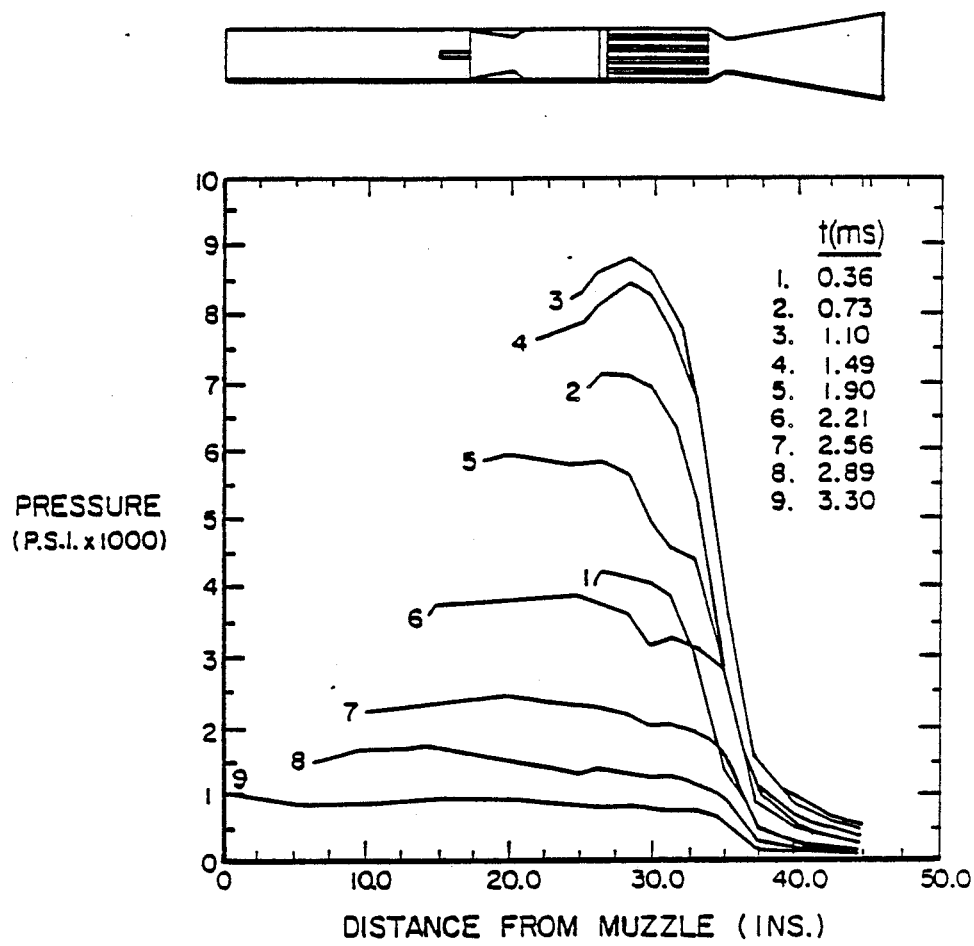
FIG. 5 shows a graph of ballistic pressure profiles within the LRG of FIG. 1 at various times during a firing.

From FIG. 5 it can be seen that on firing the maximum pressures occur in the breech area, as would be expected. Multiplying by approximately 1.5 give the design pressure profile, the maximum pressure in the breech area therefore being about 14,000 p.s.i. Although the pressures encountered in the cone portion of the venturi are much lower, it is still necessary to design to the maximum pressures in the breech area since the venturi cone starts at the breech area, and at its threaded connection to the throat ring/breech adapter it will be subjected to pressures much higher than those encountered downstream.

Venturi stress analysis by strength-of-materials methods involves the calculation of axial and tangential stress factors ($\eta_a$ and $\eta_t$, respectively) as a function of section radius (r), throat radius ($r_t$), the reciprocal of nozzle slope ($\phi$), and the ratios of thrust ($F/F_t$) and pressures ($P/P_o$). The effective stress factor $f_e$ is then computed using the relation $f_e = (\eta_a^2 + \eta_a \eta_t + \eta_t^2)^{\frac{1}{2}}$ with the required wall thickness being $$t_r = \frac{F_t P_o}{\gamma} f_e$$

$\gamma$ being the yield strength of the wall material.

However, the actual wall thickness is usually considerably greater and, after computing an effective actual wall thickness $t_e$, the effective stress is then $$\sigma_e = f_e \frac{P_o r_t}{t_e}$$

Table 1 summarizes the required calculations for the nozzle throat, exit and two intermediate sections of an LRG with the chamber pressure being the peak design pressure of 14,000 p.s.i. It is seen that the effective stresses are less than $\frac{1}{3}$ the yield stress of the material. The optimum fibre winding angle at each section may be determined by taking the inverse tangent of $\eta_t/\eta_a$ giving a range of 90° at the nozzle exit to 76.5° at the breech (throat) area. A fair compromise is to use a constant winding angle of 80° or less (if greater axial strength for resistance to impact is desired).

TABLE 1

Calculation of Wall Stresses in LRG Venturi
$P_o = 14,000$ p.s.i. $\gamma = 114,000$ p.s.i.

|  | Exit | Intermediate Position |  | Throat |
|---|---|---|---|---|
| r | 2.515 in | 2.156 | 1.796 | 1.437 |
| $r/r_t$ | 1.750 | 1.500 | 1.250 | 1.0 |
| $(r/r_t)^2$ | 3.063 in$^2$ | 2.250 | 1.563 | 1.0 |
| $r_1$ | ∞ | ∞ | ∞ | ∞ |
| $r_t/r_1$ | 0 | 0 | 0 | 0 |
| $\phi$ | 84.41° | 84.41° | 84.41° | 90° |
| sin $\phi$ | 0.9952 | 0.9952 | 0.9952 | 1.0 |
| $F/F_t$ | 1.2040 | 1.065 | 1.063 | 1.0 |
| $\psi$ | 1.503 | 1.454 | 1.327 | 1.248 |
| $P/P_o$ | 0.0456 | 0.0761 | 0.235 | 0.630 |
| $\psi_e - \psi$ | 0 | 0.049 | 0.176 | 0.255 |
| $\eta_a$ | 0 | 0.0164 | 0.0707 | 0.128 |
| $\eta_t$ | 0.0802 | 0.115 | 0.295 | 0.634 |
| $\eta_t/\eta_a$ | ∞ | 7.01 | 4.17 | 4.95 |
| $f_e$ | 0.0802 | 0.124 | 0.336 | 0.707 |
| $t_r$ | 0.014 ins. | 0.022 | 0.059 | 0.125 |
| $t_n$ | 0.059 ins. | 0.085 | 0.112 | 0.138* |
| $W_a$ | 1.023 | 1.039 | 1.062 | 1.096 |
| W | 1.022 | 1.037 | 1.059 | 1.091 |
| $t_e$ | .055 | 0.0798 | 0.106 | 0.131 |
| $\sigma_e$ | 29,200 | 31,300 | 63,800 | 108,600 |

*obtained by linearly extrapolating venturi cone contour; actual wall thickness is considerably greater because of breech attachments.

Figure 4:
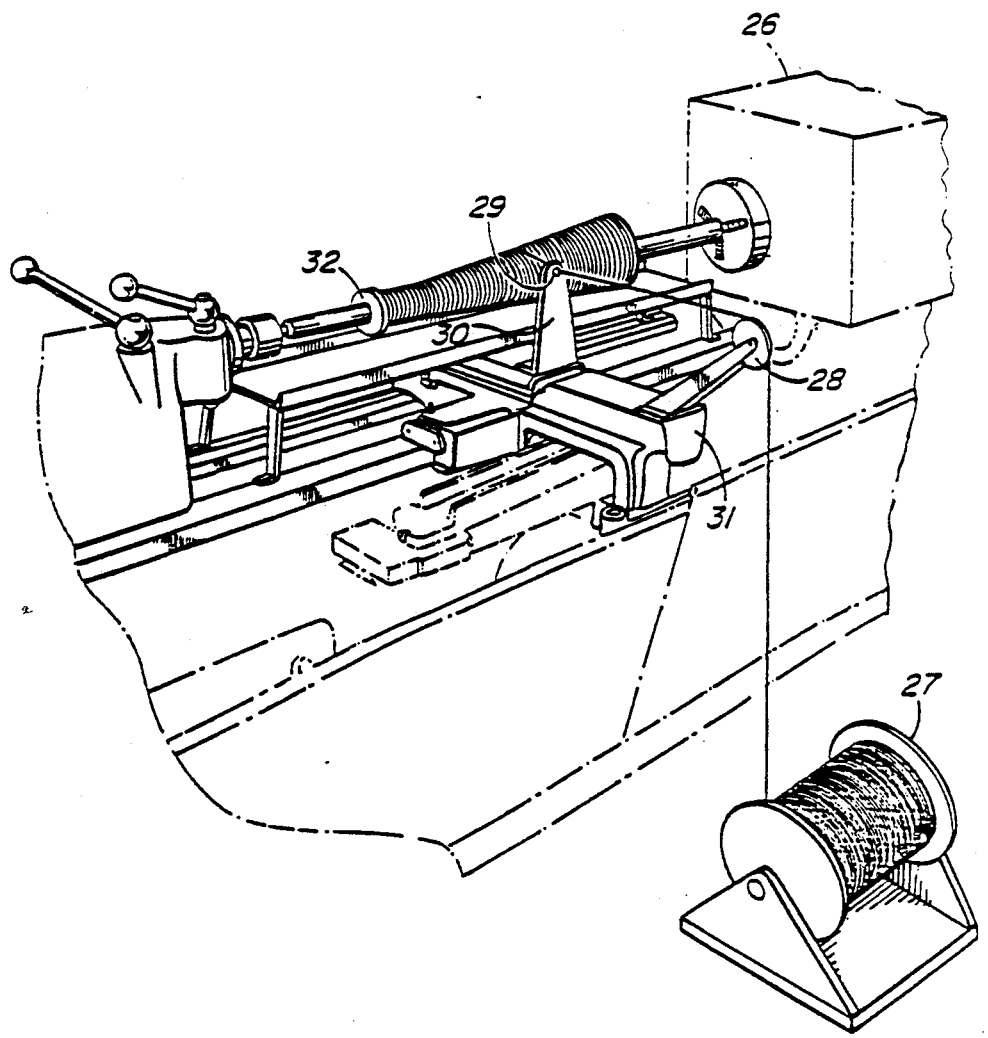
FIG. 4 shows a typical winding machine for producing a venturi cone for the LRG of FIG. 1.

GLOSSARY FOR TABLE 1
r - radius at given cross-section
$r_1$ - radius at curvature of cone wall
$r_t$ - radius at throat
$\phi$ - cone slope at cross-section
F - thrust at cross-section
$F_t$ - thrust at throat
$\psi$ - modified thrust factor
$\eta_a$ - axial stress factor
$\eta_t$ - tangential stress factor
$f_e$ - equivalent stress factor
$t_r$ - required wall thickness
$t_n$ - nominal wall thickness
$W_a$ - apparent wall ratio
W - actual wall ratio
$t_e$ - effective wall thickness
$\sigma_e$ - effective stress Having prepared the mandrel 32 and determined the desired winding angle the next step involves the actual production of a venturi cone. The mandrel 32 is placed in the bed of an automatic, preferably computer controlled, winding machine and a tow of the epoxy resin-treated fibre material is wound thereon. FIG. 4 shows a simplified typical winding machine 26 in which the mandrel 32 is mounted. The tow of winding material comes from a spool 27 and is fed over a guide roller 28, through die hole 29 in a guide member 30 to the mandrel. The guide roller 28 and guide member 30 are mounted on a carriage 31 that moves along the bed of the machine 26 under the direction of a machine program. Such program can control the machine whereby the tow of composite material is wound on the mandrel at the desired constant tension, about 8 lbs., in the desired number of layers and at the desired angle. Further details of the machine need not be described, as such machines are commercially available and do not form a part of the present invention.

The tow of carbon fibre material may have been impregnated or coated with a suitable epoxy resin before being wound on the spool 27, whereby no further operations on the tow are required. Alternatively a non-treated tow of carbon fibre material may be provided on the spool 27 and, as the tow is wound from the spool, it may pass through the nip defined by a pair of kissing rollers (not shown) one of which rotates through an epoxy resin bath and thus transfers to the tow prior to winding on the mandrel.

As indicated previously it is desirable to include at least one layer, being the innermost layer 50 (FIG. 3a) of the venturi cone, that improves the resistance of hot gas erosion. That layer 50 could be a fabric of carbon fibres woven so as to have weft and warp filaments. Alternatively fabrics of silicon carbide or ceramic fibres may also be applied. It could be a tape of longitudinally extending carbon filaments embedded in an epoxy resin matrix and hoop wound on the mandrel as close to 90° to the venturi axis as possible. It could also include a plurality of layers of the tow hoop-wound on the mandrel at about 90° to the venturi axis.

After the desired number of layers have been wound on the mandrel, the mandrel is removed from the winding machine and placed in an oven for curing.

The curing times and temperatures will of course depend on the materials used. After curing, the venturi cone is removed from the mandrel in a manner as described previously and any machining that is required may be executed.

Figure 3A:
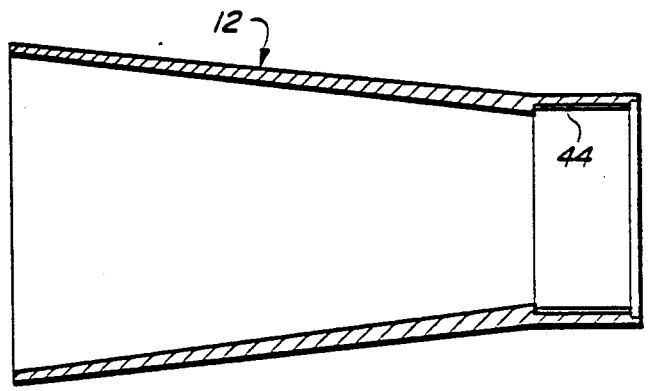
FIG. 3a shows a longitudinal cross-section of a venturi section of the LRG of FIG. 1.

FIG. 3a shows the venturi cone 12 with a thread section 44 at the smaller end for connection to the appropriate breech portion 18. Gas erosion and infiltration problems at the breech area may be minimized by filling the threaded connection with epoxy resin.

In summary, the present invention is related to the construction of venturi sections for guns subjected to high internal pressures on firing. Specifically, the present invention utilizes a tow of fibres (e.g. carbon) in the matrix of a low-viscosity, thermosetting epoxy resin, with the tow being wound on a mandrel in a particular configuration to obtain a venturi cone section having the desired properties of lightness and relatively long life. At least the innermost layer or layers 50 are provided primarily to minimize hot gas erosion and the remaining layers 52 are wound at an optimum helical angle a relative to the venturi cone axis X-X (FIG. 3). The optimum helix angle is in the vicinity of 80°, although a range of about 70° to 90° is acceptable. Preferably, the hot gas erosion preventing material comprises resin-impregnated fabrics of carbon, silicon-carbide or ceramic fibre to resist the gas pressures and the temperatures experienced in the breech area, which temperatures can approach 3000° K. on firing, albeit for very short periods of time. Carbon fibre and ceramic fibre fabrics have proven particularly successful, especially the ceramic fibre "Nextel" manufactured by the 3 M Company. This material comprises $Al_2O_3$, $B_2O_2$ and $SiO_2$. It has been found that in use the epoxy resin carbonizes, leaving a highly resistant carbon-carbon or carbon-ceramic composite layer. An improved effect may be possible with a phenolic resin matrix.

LRG using a venturi section produced in accordance with the present invention has been able to fire over 50 rounds of ammunition. This represents a considerable improvement over existing wapons produced by conventional methods which fail after the firing of 5 to 10 rounds. In addition to having a longer effective life, weapons using venturi sections produced in accordance with this invention are substantially lighter in weight than conventionally-produced weapons and they are also less expensive to produce.

Venturi sections prepared in accordance with this invention are much easier and less costly to fabricate than the erosion-resistant carbon-carbon cones used on several space rocket vehicles. Given the short duration of hot gas flow through the venturi (about 3.5 m sec.) there is little heat build-up of the venturi, other than at the inner surface. Therefore, using an innner layer of fabric for erosion-protection and helical windings above for optimum strength gives the most effective venturi for the LRG application.

While the foregoing has disclosed the basic features of the present invention it is clear that alternative configurations or changes could be effected by a person skilled in this art without departing from the spirit of the invention. Thus, the protection to be afforded the invention is to be determined from the claims appended thereto.

The embodiments of the invention in which an exclusive property or privilege is claimed are defined as follows:

1. In a light weight recoilless gun of the type comprising a barrel with breech and muzzle ends, a venturi with a small diameter breech end and a large diameter exit end, and a breach assembly for releasably securing the breech ends of the barrel and venturi, whereby on firing of the gun, the venturi is subject to the erosive effects of high velocity and high temperatures gas flow, the improvement wherein:
   the venturi comprises a non-metallic frustoconical diffuser consisting solely of:
   an innermost layer comprising ceramic fiber material of $Al_2O_3$, $B_2O_3$ and $SiO_2$ embedded in a cured epoxy resin matrix, said innermost layer being resistant to hot gas erosion on firing; and
   a plurality of outer layers comprising a synthetic fiber material helically-would at an average helix angle selected to provide adequate axial and hoop strengths for resisting axial thrust and hoop loads produced on firing and embedded in said epoxy resin matrix.

2. The invention of claim 1 wherein said helix angle lies in the range of 70° to 90° to the venturi axis.

3. The invention of claim 1 wherein said helix angle is substantially 76.5° to the venturi axis adjacent the small diameter end of the venturi and is substantially 90° to the venturi axis at the large diameter end.

4. The invention of claim 1 wherein said helix angle averages substantially 80° to the venturi axis.

5. The invention of claim 1 including a plurality of internal threads at the small diameter end of the venturi for threaded engagement to said breech assembly.

6. The invention of claim 1 wherein said outer layers comprise an epoxy resin-carbon fiber composite.

7. In a light weight recoilless gun of the type comprising a barrel with breech and muzzle ends, a venturi with a small diameter breech end and a large diameter exit end, and a breech assembly for releasably securing the breech ends of the barrel and venturi, whereby on firing of the gun, the venturi is subject to the erosive effects of high velocity and high temperature gas flow, the improvement wherein:
   the venturi comprises a non-metallic frustoconical diffuser consisting solely of an innermost layer comprising a textile fabric formed of ceramic fiber material comprising $Al_2O_3$, $B_2O_3$ and $SiO_2$ embedded in a cured resin matrix, said innermost layer being resistant to erosion by hot gases generated on firing, and
   a plurality of outer layers embedded in said cured, resin matrix, and comprising a tow of multi-filament materially helically-wound at an average helix angle selected to provide adequate axial and hoop strengths for resisting axial thrust and hoop leads produced on firing.

8. The invention of claim 7 wherein said outer layers comprise an epoxy resin-carbon fiber composite.

* * * * *